(12) United States Patent
Stanger et al.

(10) Patent No.: US 6,261,621 B1
(45) Date of Patent: Jul. 17, 2001

(54) METHOD AND APPARATUS FOR PROVIDING EXTENDED FRIED FOOD HOLDING TIMES

(75) Inventors: Keith A. Stanger, New Port Richey, FL (US); Sedef K. Josephson, Shreveport, LA (US)

(73) Assignee: The Frymaster Corporation, Shreveport, LA (US)

( * ) Notice: Subject to any disclaimer, the term of this patent is extended or adjusted under 35 U.S.C. 154(b) by 0 days.

(21) Appl. No.: 09/401,678

(22) Filed: Sep. 22, 1999

Related U.S. Application Data
(60) Provisional application No. 60/101,462, filed on Sep. 23, 1998.

(51) Int. Cl.$^7$ .............................. F26B 7/00; A47J 36/24
(52) U.S. Cl. .................. 426/520; 426/523; 99/483; 99/474; 219/214
(58) Field of Search .......................... 99/483, 474, 476, 99/426; 34/225, 197, 195; 219/400, 385, 395, 214; 126/21 A; 426/523, 520; 62/256

(56) References Cited

U.S. PATENT DOCUMENTS

| | | | |
|---|---|---|---|
| 3,120,599 | 2/1964 | Hilgers | 219/34 |
| 4,110,916 | 9/1978 | Bemrose | 34/197 |
| 4,159,955 | 7/1979 | Asmus, Jr. | 210/473 |
| 4,192,081 | 3/1980 | Erickson et al. | 34/225 |
| 4,300,358 * | 11/1981 | Hino et al. | 62/256 |
| 4,499,818 | 2/1985 | Strong | 99/483 |
| 4,972,824 * | 11/1990 | Luebke et al. | 121/21 A |
| 4,990,749 * | 2/1991 | Devine et al. | 219/385 |

FOREIGN PATENT DOCUMENTS
| | | |
|---|---|---|
| 01055151 | 3/1989 | (JP) . |
| 09206223 | 8/1997 | (JP) . |

\* cited by examiner

*Primary Examiner*—Milton Cano
*Assistant Examiner*—Robert A. Madsen
(74) *Attorney, Agent, or Firm*—Ohlandt, Greeley, Ruggiero & Perle, L.L.P.

(57) ABSTRACT

Apparatus for holding fried food product for a holding time, defined as the time between the completion of cooking and the time that the food product no longer has a desired warmth, crispness and interior moisture for serving to a customer. The fried food is disposed in a holder or bin and subjected to heat from an upper heater, a lower heater and forced hot air that is applied through and across the fried food. The hot air flow serves to evaporate moisture from the fried food surface and to remove water vapor from the region above the fried food, whereby the holding time is extended to about 20 minutes.

27 Claims, 4 Drawing Sheets

METHOD AND APPARATUS FOR PROVIDING EXTENDED FRIED FOOD HOLDING TIMES

This application claims the benefit of U.S. Provisional Application 60/101,462, filed Sep. 23, 1998.

FIELD OF INVENTION

This invention relates to apparatus for the preparation of food products for restaurant service and more particularly to an apparatus and method for keeping fried food product warm for an extended period of time after they have been cooked, but before they are served.

BACKGROUND OF INVENTION

Deep frying and similar cooking techniques can provide fried food product, such as French fried potatoes, hash brown potatoes, fried chicken nuggets and the like, upon completion of cooking that have desired characteristics of crispness of their exterior and warmth and moistness of their interior. It is generally recognized that crispness of fried foods is adversely affected in a relatively short time after they are cooked due to moisture migrating from the interior of the product to its exterior surface. As a result, the exterior surface becomes moist. The crispness deteriorates to a soggy and/or greasy condition that can result in a taste of the frying medium. This seriously degrades the sensory appeal of the fried food product. The holding time is the time a fried food product can be held after completion of cooking until its crispness, warmth, and interior moisture have deteriorated to the point that it is unsuitable for serving to a customer.

One prior art technique of maintaining the desired characteristics of freshly prepared fried foods is to place them in a heated cabinet having doors or drawers. This technique has a disadvantage that the fried food is not easily accessible. Another prior art technique places the fried food product in a holder and applies radiant heat to them. Both of these techniques have been popular as they tend to keep the fried food product warm. However, the crispness deteriorates after a short time due to moisture migration from the product interior to its surface. For commercial versions of these products, the holding time is limited to ten minutes or less before the fried food loses its sensory appeal.

U.S. Pat. No. 4,499,818 provides an alternative technique of maintaining surface crispness and interior moisture of fried food product. This patent uses a recirculating hot air system that blows hot air from below the fried food and/or from the sides thereof to both warm the fried food and to evaporate surface moisture. The hot air is returned via a vent that is positioned to one side of the fried food. A problem with this technique is that water vapor forms in the region above the fried food that is out of the air recirculation path. The water vapor condenses and returns moisture to the topmost layer of the fried food. This limits the time that the fried food can maintain its crispness.

In the fast food industry, it is desirable to enhance the holding time that fried food maintains warmth, surface crispness and interior moisture to as long as possible.

The present invention has a main object of maintaining a crisp surface and a warm moist interior of fried food for as long as possible.

Another object of the present invention is to provide an apparatus that effectively removes moisture as well as water vapor from the vicinity of the fried food.

Still another object is to provide an apparatus that provides a significant increase in fried food holding time over currently available equipment.

Yet another object is to provide a method for warming freshly prepared fried food and removing moisture and water vapor from the vicinity of the fried food.

SUMMARY OF INVENTION

Apparatus according to the present invention includes a holder having a surface upon which freshly prepared fried food product is disposed. A upper heater is disposed above the fried food product to apply heat thereto in a downward direction. A lower heater is disposed beneath the fried food product for applying heat thereto in an upward direction. An air flow assembly is arranged to apply a forced air flow in a direction generally transverse to said upward and downward directions through and across the fried food product. The air flow is operative to evaporate surface moisture from the fried food product and to remove water vapor from a region above the fried food product.

A method according to the present invention involves applying heat in both a downward direction and in an upward direction to the fried food product. A hot air flow is directed through and across the fried food product in a direction generally transverse to the upward and downward directions. The hot air flow operates to evaporate surface moisture from the fried food product and to remove water vapor from a region above the fried food product.

In one embodiment of the apparatus and method of the invention, the hot air flow is developed from a fresh supply of ambient air and is deflected back to ambient after passing across or through the fried food product. In another embodiment of the apparatus and method of the invention, the hot air flow is recirculated.

BRIEF DESCRIPTION OF DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
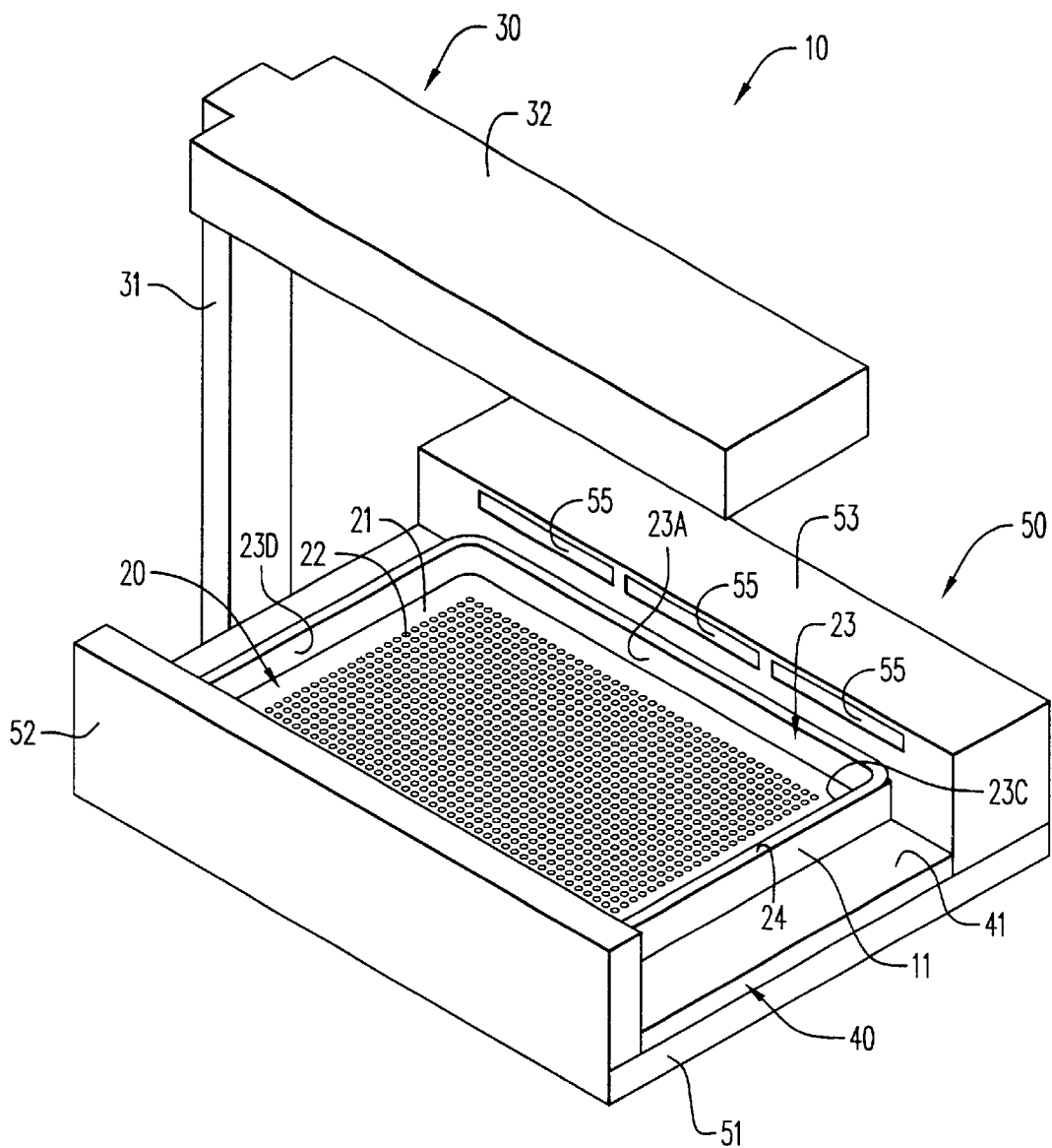
FIG. 1 is a perspective view of a first embodiment of the present invention of an apparatus for holding and maintaining the warmth, moisture and crispness of fried food product.
Figure 2:
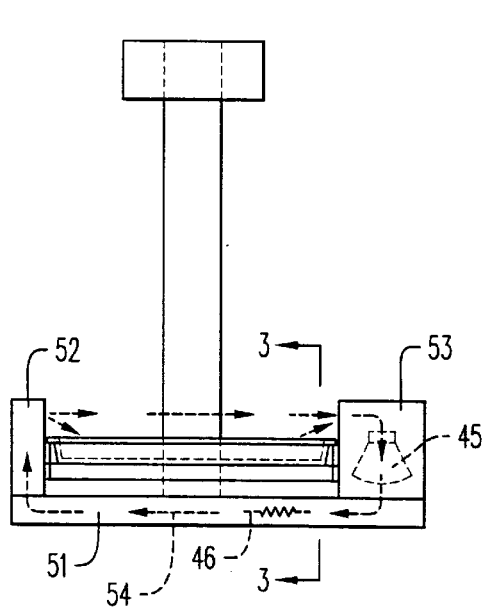
FIG. 2 is a front elevational view of FIG. 1.
Figure 3:
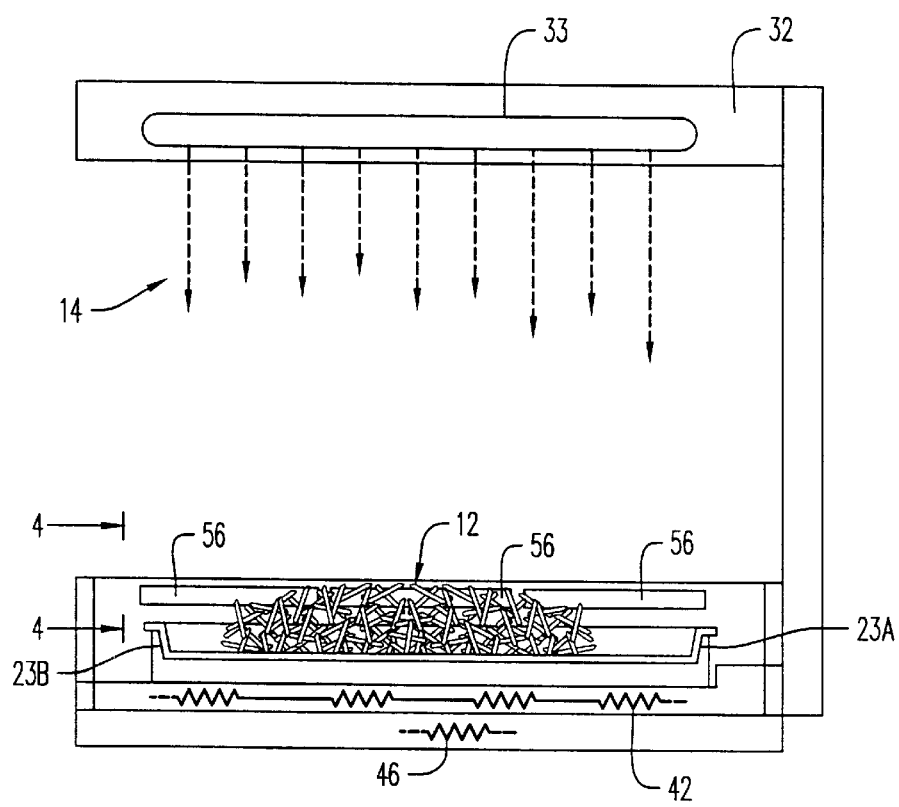
FIG. 3 is an enlarged cross-sectional view taken along the line 3—3 of FIG. 2.

With reference to FIGS. 1 through 3, there is provided an apparatus 10 for maintaining the warmth, moisture and crispness of freshly fried food according to a first embodiment of the invention. Apparatus 10 includes a holder 20, an upper heater 30, a lower heater 40 and a forced air flow assembly 50.

Holder 20 has a surface 21 that contains a plurality of apertures 22 arranged to diffuse heat emanating from lower heater 40 as well as to allow grease, crumbs, salt and the like to drop through. A quantity of fried food product 12, shown as French fried potatoes in FIG. 3, is disposed on surface 21. Holder 20 has a peripheral upright wall 23 that has a pair of side walls 23A and 23B, a front wall 23C and a back wall 23D. A box shaped bracket 11 extends upwardly from a top surface 41 of lower heater 40. Peripheral wall 23 has a rim 24 that rests on the top of bracket 11. As best seen in FIGS. 2 and 3, bracket 11 serves to dispose surface 21 of holder 20 a short distance above heater 40. For example, this distance may be on the order of 1 to 3 inches for French fried potatoes.

Box shaped bracket 11 may be removable for the purpose of cleaning, particularly if it is used to trap or collect droppings from surface 21 such as grease, crumbs, salt and the like. Alternatively, these droppings could be collected on a separate sheet or in a separate container that is removable for cleaning. Surface 21 may be flat as shown or curved and holder 20 may be rectangular as shown or any other desired shape.

Heater 40 may be any suitable heater for applying heat in an upward direction to the underside of surface 21. Surface 21 transfers this heat for application in an upward direction to fried food product 12 by natural convection. By way of example, heater 40 is shown as a platen having a top surface 41. Lower heater 40 contains an electrical heating coil 42, shown schematically in FIG. 3. Electrical heating coil 42 is disposed below platen surface 41 to heat top surface 41.

Upper heater 30 includes an upright bracket 31 that is mounted to forced air flow assembly 50. Horizontal bracket 32 extends from upright bracket 31 over holder 20 intermediate side walls 23A and 23B. Horizontal bracket 32 contains a radiant heater element 33 that is arranged to radiate heat in a downward direction to fried food 12 as shown by dashed arrows 14 in FIG. 3. It will be apparent to those skilled in the art that two or more radiant elements may be used.

Forced air flow assembly 50 includes a base section 51 upon which heater 40 is disposed. Assembly 50 also includes walls 52 and 53 that extend vertically from base 51 on opposed sides of heater 40. Base 51 and walls 52 and 53 are either hollow or contain air passageways to provide a recirculating air flow path as shown in FIG. 2 by dashed arrows 54. Wall 53 contains one or more fans 45 that are arranged to take in air through a set of air intake ports 55 shown in FIG. 1. Fans 45 accelerate the air flow downward in wall 53, across base 51 and then upward in wall 52. The air flow then continues out of wall 52 via a set of air delivery ports 56. An air heater 46 is disposed downstream of the fans. Air heater 46 is preferably disposed as close to air delivery ports 56 as design limitations permit, preferably in either wall 52 or in base 51, as shown in FIGS. 2 and 3.

Figure 4:
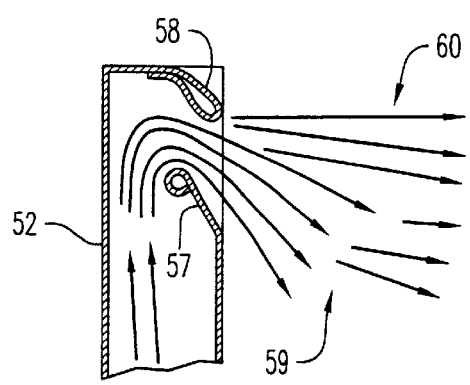
FIG. 4 is a partial enlarged cross sectional view taken along lines 4—4 of FIG. 3.

Referring to FIG. 4, a baffle 57 and a baffle 58 are positioned to direct the air flow in a direction generally transverse to the upward and downward directions of heat provided by upper and lower heaters 30 and 40. This direction is through fried food product 12 as shown by arrows 59 and across fried food product 12 as shown by arrows 60. The air flow deflected through fried food product serves to evaporate moisture that forms on the fried food surface as well as to provide additional heating. The air flow deflected over and across fried food product 12 serves to remove any water vapor formed by evaporation from the region above fried food product 12. The water vapor either is forced away from the region above fried food product 12 or is swept by the air flow into the air intake ports 55.

The combined heat from upper heater 30, lower heater 40 and air flow assembly 60 operates to extend the time that fried food 12 is warm enough to be served to customers. The forced hot air flow additionally operates to remove moisture from the surface of fried food 12, thereby maintaining the surface crispy. The air flow further acts to remove water vapor formed in the region above fried food product 12.

In one design of the first embodiment of the invention, a quantity of three pounds of French fried shoestring potatoes was found to have adequate warmth, crispness and interior moisture after a holding time of about 20 minutes.

Referring to FIGS. 5 through 8, a second embodiment of the invention includes an apparatus 100 for maintaining the warmth, moisture and crispness of freshly fried food. Apparatus 100 includes a frame 170, a holder 120, an upper heater 130, a lower heater 140 and a fan or blower 145. Frame 170 includes a base 151, air duct pieces 178, 180 and 182, a front wall 174 and a back wall 176. Lower heater 140 and blower 145 are mounted on base 151.

Air duct pieces 178, 180 and 182 and base 151 are joined together to form a passageway that together with lower heater 140 and blower 145 form a forced air assembly. To this end, air duct piece 182 has a flat portion 183 with downwardly extending side panels 184 that are secured to base 151 by any suitable fastener, such as by screws or bolts. Side panels 184 are dimensioned to provide adequate spacing to accommodate lower heater 140. Air duct piece 182 also has an upwardly extending wall 185 with an air delivery cutout 186 and a baffle 188 positioned in delivery cutout 186. Baffle 188 is oriented to guide or direct air in a direction that is generally horizontal and/or angled slightly downwardly so as to flow across and through food product 12.

Figure 8:
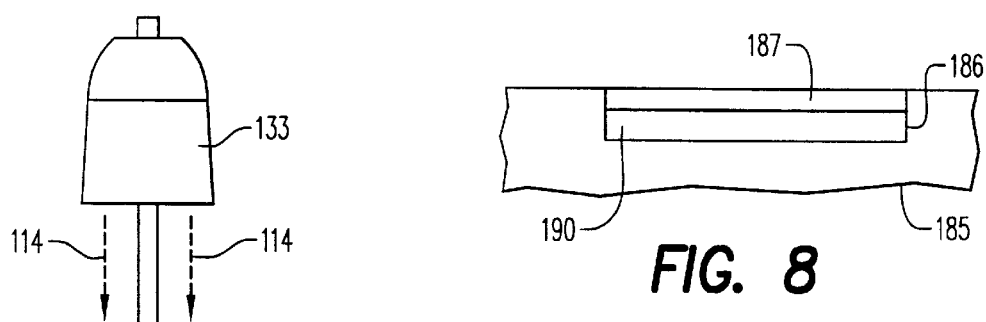
FIG. 8 is a fragmentary view of the assembled exhaust port area of FIG. 7.

Air duct piece 180 has a box shape that is secured to wall 185 and base 151 by any suitable fasteners, such as screws or bolts. Air duct piece 180 also has a downwardly extending flange 187 that extends partially into air delivery cutout 186 to form an air delivery port 190, as shown in FIG. 8. Air duct piece 178 is shaped to fit over blower 145 and is secured to base 151 and to flat portion 183 by any suitable fastener, such as screws or bolts. Air duct piece 178 includes an air intake port shown as one or more air intake vents 179. The duct work thus formed provides an air flow passageway from intake vents 179, through blower 145, lower heater 140 via the space between base 151 and flat portion 183, upwardly through box shaped duct piece 180 and out via delivery port 190.

Frame 170 also includes a front wall 174 and a back wall 176. Front wall 174 and back wall 176 are each secured to base 151 and to air duct pieces 178, 180 and 182 by suitable fasteners, such as screws or bolts.

Figure 7:
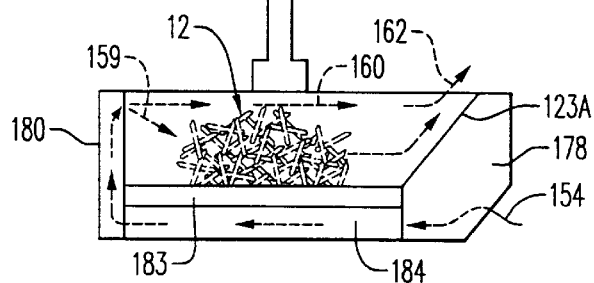
FIG. 7 is a front elevational view of FIG. 5.

Holder 120 has a surface 121 that contains a plurality of apertures 122 arranged to diffuse heat emanating from lower heater 140 via flat portion 183 as well as to allow grease, crumbs, salt and the like to drop through. A quantity of fried food product 12, shown as French fried potatoes in FIG. 7, is disposed on surface 121.

Holder 120 has a peripheral wall 123 extending generally upward from surface 121. Peripheral wall 123 has a pair of side walls 123A and 123B, a front wall 123C and a back wall 123D. Side wall 123A, front wall 123C and back wall 123D are inclined or sloped outwardly from perforated surface 121. Back wall 123B is substantially vertical.

Holder 120 sits in a like shaped, but slightly larger, box 111. Box 111 has a rim 113. Peripheral wall 123 has a rim 124 that rests on rim 113 of box 111. Rim 113 rests on the top of frame 170 formed by front wall 174, back wall 176 and air duct pieces 178, 180 and 182. As best seen in FIG. 7, box 111 is dimensioned to dispose surface 121 of holder 120 a short distance above flat portion 183. For example, this distance may be on the order of 1 to 3 inches for French fried potatoes.

Figure 5:
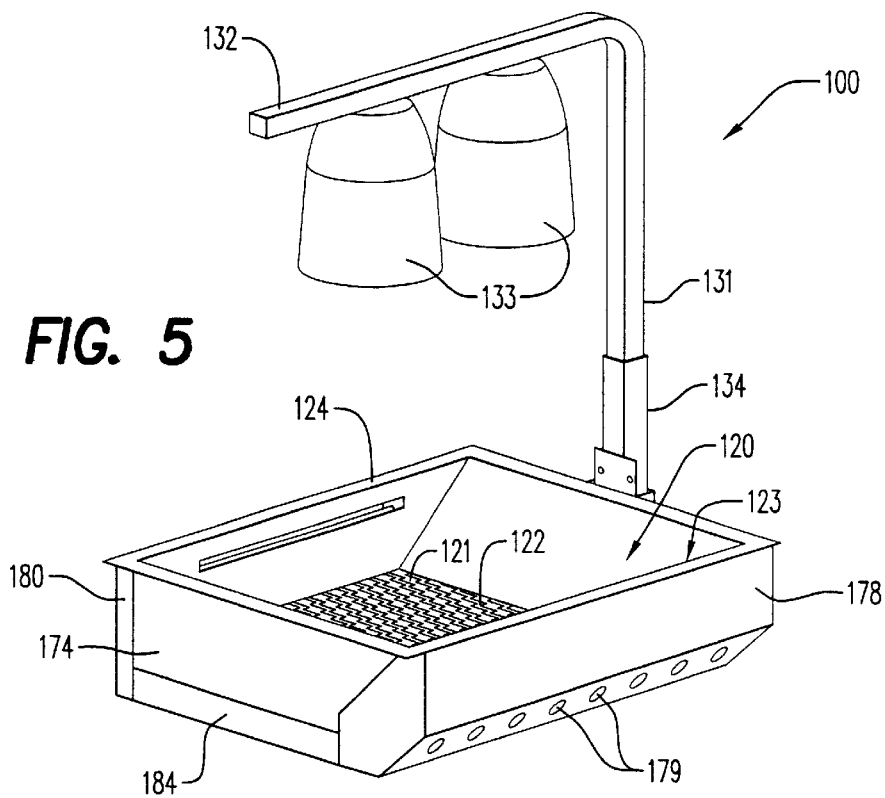
FIG. 5 is a perspective view perspective view of another embodiment of the present invention of an apparatus for holding and maintaining the warmth, moisture and crispness of fried food product.

Side wall 123B of holder 120 has a slot 126 and box 111 has a slot 127. When fully assembled as shown in FIGS. 5 and 7, slots 126 and 127 are aligned with one another and with air delivery port 190.

Box 111 may be removable for the purpose of cleaning, particularly if it is used to trap or collect droppings from surface 121 such as grease, crumbs, salt and the like. Alternatively, these droppings could be collected on a separate sheet or in a separate container that is removable for cleaning. Surface 121 may be flat as shown or curved and holder 120 may be any other desired shape.

Lower heater 140 may be any suitable heater for applying heat in an upward direction to the underside of surface 121. Surface 121 transfers this heat for application in an upward direction to fried food product 12 by natural convection. By way of example, heater 140 is shown as an electrical resistance coil. As shown, lower heater 140 serves a dual purpose of heating air and food product 12. In alternate embodiments of the invention, two separate heaters may be used. One heater would be disposed in the air flow path to heat the air. The other heater would be disposed beneath flat portion 183 to heat food product 12.

Upper heater 130 includes an upright bracket 131 that is mounted to frame 170. To this end, back wall 176 has a slot 177 in which a sleeve 134 is seated and secured by any suitable fastener, such as screws or bolts. Upright bracket 131 is seated in sleeve 134. Horizontal extension 132 extends from upright bracket 131 over holder 120 intermediate side walls 123A and 123B. Two radiant heater elements 133 are mounted to horizontal extension 132. Radiant heater elements 133 radiate heat in a downward direction to fried food 12 as shown by dashed arrows 114 in FIG. 7. It will be apparent to those skilled in the art that more or less radiant elements may be used.

Figure 6:
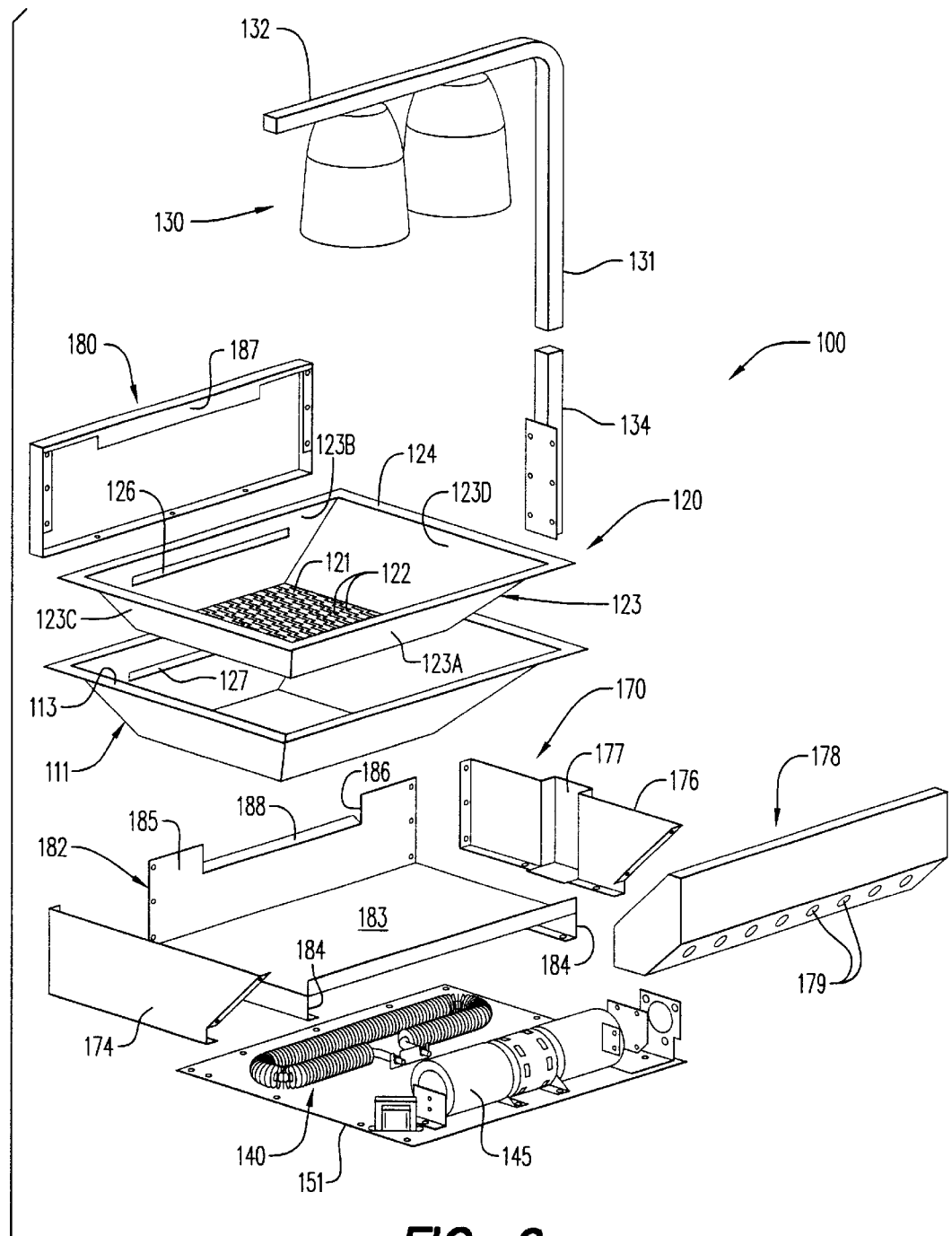
FIG. 6 is an exploded view of FIG. 5.

Referring to FIGS. 5 through 7, blower 145 draws ambient air through air vents 179 and accelerates the air through a passageway defined by base 151 and air duct pieces 180 and 182 to air delivery port 190, as shown by the arrows 154 in FIG. 7. This passageway is along the spacing formed between base 151 and flat portion 183 and box shaped duct 180. Baffle 188 directs air flow in a direction generally transverse to the upward and downward directions of heat provided by upper and lower heaters 130 and 140. This direction is through food product 12 as shown by arrows 159 and across fried food product 12 as shown by arrows 160.

The air flow deflected through fried food product serves to evaporate moisture that forms on the fried food surface as well as to provide additional heating. The air flow deflected over and across fried food product 12 serves to remove any water vapor formed by evaporation from the region above fried food product 12. The water vapor either is forced away from the region above fried food product 12 or is swept by the air flow into ambient air. This is aided by the sloped surface of side wall 123A that deflects the air flow upwardly as shown by arrows 162 in FIG. 7.

The combined heat from upper heater 130, lower heater 140 and the heated air flow operates to extend the time that fried food product 12 is warm enough to be served to customers. The forced hot air flow additionally operates to remove moisture from the surface of fried food 12, thereby maintaining the surface crispy. The air flow further acts to remove water vapor formed in the region above fried food product 12.

The method according to the present invention involves applying heat in both a downward direction (from upper heater 30, 130) and in an upward direction (from lower heater 40, 140) to fried food product 12. A hot air flow is directed (from hot air delivery port 56, 190) through and across fried food product 12 in a direction generally transverse to the upward and downward directions. The hot air flow operates to evaporate surface moisture from fried food product 12 and to remove water vapor from a region above fried food product 12.

In the embodiment of FIGS. 1 through 4, the hot air flow is recirculated. In the embodiment of FIGS. 5 through 8, the hot air is developed from a fresh supply of ambient air and is deflected to ambient after passing across or through fried food product 12.

The present invention having been thus described with particular reference to the preferred forms thereof, it will be obvious that various changes and modifications may be made therein without departing from the spirit and scope of the present invention as defined in the appended claims.

What is claimed is:

1. Apparatus for holding and maintaining the crispness of freshly prepared fried food product, comprising:

a holder having a surface upon which said fried food product is disposed;

an upper heater disposed above said fried food product for directing heat in a downward direction to said fried food product;

a lower heater disposed below said surface for directing heat in an upward direction, said fried food product being heated by said upper heater and said lower heater; and an air flow assembly arranged to force air flow in a direction generally transverse to said upward and downward directions through and across said fried food product to effectively evaporate surface moisture from said fried food product and remove water vapor from the region above said fried food product, wherein said upper heater and said lower heater are operable independently of said air flow assembly.

2. The apparatus of claim 1, further comprising:

an air heating means for heating said air flow prior to its forced passage through and across said fried food product.

3. The apparatus of claim 2, wherein said holder further includes first and second opposed walls extending above said surface, an air delivery port means disposed in said first wall, and wherein said airflow assembly is in fluid communication with said air delivery port means to produce said forced air flow.

4. The apparatus of claim 2, wherein said air flow assembly provides for recirculation of said air flow.

5. The apparatus of claim 4, wherein said holder surface has a plurality of apertures spaced to provide a diffusion of said upwardly directed heat to a bottom most layer of said fried food product.

6. The apparatus of claim 5, wherein said holder is a bin having an upright peripheral wall.

7. The apparatus of claim 6, wherein said air flow assembly includes an air delivery port and an air intake port disposed on opposite sides of said fried food product to provide said air flow.

8. The apparatus of claim 7, wherein said air flow assembly includes a baffle that is disposed at said air delivery port to direct said air flow across and through said fried food product.

9. The apparatus of claim 2, wherein said air flow assembly includes an air passageway, an air intake port means, an air delivery port means and a blower, said blower drawing ambient air via said air intake port to form and accelerate said air flow through said passageway to said air delivery port.

10. The apparatus of claim 9, further comprising a deflector disposed in relationship to said air flow to deflect all of said air flow to ambient air after the air flow has passed through or over said fried food product.

11. The apparatus of claim 10, wherein said surface is a bottom surface of said holder and said deflector is a side surface of said holder.

12. The apparatus of claim 11, wherein said side surface is sloped relative to said bottom surface.

13. The apparatus of claim 12, wherein said air flow assembly includes a baffle that is disposed at said air delivery port to direct said air flow across and through said fried food product.

14. The apparatus of claim 13, wherein said bottom surface has a plurality of apertures spaced to provide a diffusion of said upwardly directed heat to a bottom most layer said fried food product.

15. The apparatus of claim 1, wherein said lower heater supplies heat in a natural convective manner in said upper direction.

16. The apparatus of claim 15, wherein said upper heater radiates heat in said downward direction.

17. Apparatus for holding and maintaining the crispness of freshly prepared fried food product, comprising:
a holder having a surface upon which said fried food product are disposed, said surface having a plurality of apertures;
an upper heater disposed above said fried food product, said upper heater including a radiant heating element that radiates heat in a downward direction to said fried food product;
a lower heater disposed below said surface for directing heat in a natural convective manner in an upward direction, said fried food product being heated by said upper heater and said lower heater; and
a recirculating air flow assembly including means to heat said air flow, said assembly being arranged to force said hot air flow in a direction generally transverse to said upward and downward directions through and across said fried food product to effectively evaporate surface moisture from said fried food product and remove water vapor from the region above said fried food product, wherein said upper heater and said lower heater are operable independently of said air flow assembly.

18. The apparatus of claim 17, further comprising:
an air heating means for heating said recirculating air flow prior to its forced passage through and across said fried food product.

19. Apparatus for holding and maintaining the crispness of freshly prepared fried food product, comprising:

a holding surface upon which said fried food product is disposed;
an upper heater disposed above said fried food product for directing heat in a downward direction to said fried food product;
a lower heater disposed below said holding surface for directing heat in an upward direction, said fried food product being heated by said upper heater and said lower heater; and
an air flow assembly arranged to force air flow across said fried food product to effectively evaporate surface moisture from said fried food product and remove water vapor from the region above said fried food product, wherein said upper heater and said lower heater are operable independently of said air flow assembly.

20. The apparatus of claim 19, wherein said air flow assembly includes a deflecting surface disposed in a position to deflect substantially all of said air flow after passage over said fried food product to ambient.

21. The apparatus of claim 20, further comprising a food holding bin that has said holding surface as a bottom and said deflecting surface as a side wall.

22. The apparatus of claim 21, wherein said air flow assembly further includes an ambient air intake located below said deflecting surface.

23. The apparatus of claim 22, further comprising:
an air heating means for heating said air flow prior to its forced passage through and across said fried food product.

24. A method of holding freshly cooked fried food product to maintain warmth, crispness and interior moisture, said method comprising:
(a) applying heat in a downward direction to said fried food product;
(b) applying heat in an upward direction to said fried food product; and
(c) directing an air flow through and across said fried food product in a direction generally transverse to said upward and downward directions, said air flow operating to evaporate surface moisture from said fried food product and to remove water vapor from a region above said fried food product, wherein directing said airflow is independent of applying heat in either said upward or downward direction.

25. The method of claim 24, wherein said heat applied in a downward direction is radiant heat, said heat applied in an upward direction is by natural convection, and said air flow is preheated prior to being directed across said fried food product.

26. The method of claim 25, further comprising:
developing said air flow in a duct assembly; and
recirculating said air flow in said duct assembly.

27. The method of claim 25, further comprising:
obtaining a fresh supply of ambient air;
developing said air flow from said fresh supply of ambient air in a duct assembly; and
after passage over or through said fried food product, deflecting said hot air flow to ambient air.

* * * * *